Patented Feb. 12, 1946

2,394,761

UNITED STATES PATENT OFFICE 2,394,761

CHEMICAL PRODUCT AND PROCESS FOR MAKING THE SAME

Thomas A. Ford, Wilmington, Del., assignor to E. I. du Pont de Nemours & Company, Wilmington, Del., a corporation of Delaware No Drawing. Application April 23, 1943, Serial No. 484,212

9 Claims. (Cl. 260—505)

This invention relates to new polysulfonic acids and a process for their preparation.

It is known that certain polybasic acids are of value as assistants in the tanning of leather and as dispersing agents or detergents. The polysulfonic acids prepared by the sulfonation of polystyrene are known to show such properties to some extent. However, the usefulness of synthetic products in tanning leather or aiding dispersion, etc., depends upon a complex combination of physical and chemical properties, and the sulfonated polystyrenes are not entirely satisfactory for these purposes. Furthermore, polystyrene is not easily sulfonated, and the quality of the products may vary considerably from batch to batch without apparent cause.

It is an object of this invention to prepare new polysulfonic acids. Another object is to provide new polysulfonic acids having at least one other substituent. A further object is to prepare sulfonated aromatic telomers. Other objects will appear hereinafter.

These objects have been accomplished by sulfonating the aromatic nuclei of a telomer, each taxomon unit of which contains an aromatic nucleus, thereby producing a polysulfonic acid.

Telomers are new types of compounds produced by a process called "telomerization." In copending U. S. application Serial No. 438,466, filed April 10, 1942, it has been pointed out that the novelty of this reaction is such that, for adequate description, it has been found necessary to coin new terms to describe the reaction and the participants therein. The reaction has been called "telomerization" (from Greek *telos*, meaning "end" plus Greek *mer* meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula Y(A)$_n$Z, wherein (A)$_n$ is a divalent radical formed by the chemical union, with the formation of new carbon bonds, of the taxogen, the unit A being called a "taxomon," $n$ being any integer greater than one, and Y and Z being fragments of the telogen attached to the terminal taxomons.

Telomers of aromatic taxogens are new compositions of matter described in pending U. S. application Serial No. 464,519, filed November 4, 1942. They are prepared by the reaction of aromatic taxogens, i. e., polymerizable olefinic compounds containing aromatic substituents (such as styrene, vinyl benzoate, etc.) with telogens, i. e., telomerizing agents (such as carbon tetrachloride, ethyl trichloroacetate, hydrochloric acid, etc.). The preparation of such telomers is fully described in U. S. application Serial No. 464,519, filed November 4, 1942, which is made a part of this disclosure by reference.

A monomeric taxogen, such as styrene, is heated with 1 to 3 molecular equivalents of a telogen and approximately 0.01 molecular equivalent of a telomerization catalyst, such as benzoyl peroxide, at 100 to 200° C. for a period of about 8 hours. The product is separated from the excess of telogen and from any remaining monomeric styrene by a suitable process, such as, for example, distillation or steam distillation. The reaction temperature and the concentrations of the reactants are chosen to give a product having the desired molecular weight, according to the general rule that the average molecular weight of the product is decreased by using a higher temperature or by increasing the concentration of the telogen. When one mole of styrene is heated with two moles of carbon tetrachloride and 0.004 mole of benzoyl peroxide at 86° C. for 70 hours, the product, Cl—($C_2H_3.C_6H_5$)$_n$—$CCl_3$, is found to have an average chain length, $n$, of 21 styrene units. When 1.3 moles of carbon tetrachloride are used and the temperature is maintained at 120° C. for 8 hours, the product is found to have a chain length, $n$, of 15. When styrene is heated with 2 moles of bromoform and 0.0066 mole of benzoyl peroxide at 90 to 120° C. for 24 hours, the product, after separation from excess bromoform by distillation under diminished pressure, is found to have an average chain length of 8 styrene units. Ethyl trichloroacetate gives a product of even lower molecular weight.

A telomer of an aromatic taxogen is treated with a sulfonating agent to produce a polysulfonic acid. The product contains a multiplicity of sulfonic acid groups and at least one other substituent, the latter being derived from a fragment of the telogen used in the preparation of the telomer. By "sulfonating agent" is meant any reagent capable of introducing a sulfonic acid group into a benzenoid nucleus. It has been found that the telomers may be sulfonated by the same reagents known to be effective for monomeric aromatic organic compounds, for example concentrated sulfuric acid or chlorosulfonic acid.

In order that the invention may be more fully understood, the following examples are given by way of illustration. Parts are by weight.

Example I

One part of a styrene/carbon tetrachloride telomer having an average composition of $Cl\text{—}(C_2H_3.C_6H_5)_{21}\text{—}CCl_3$ (calculated on the basis of the chlorine content, 5.85%) is powdered and mixed with 90 parts of 95% sulfuric acid. It is then stirred and warmed on the steam bath for a period of 18 hours. The product, obtained by drowning the mixture in ice water, is soluble in water.

Example II

One part of a styrene/carbon tetrachloride telomer having an average composition of $Cl\text{—}(C_2H_3.C_6H_5)_{15}\text{—}CCl_3$ (calculated on the basis of the chlorine content of 8.39%) is finely powdered and mixed with 9 parts of concentrated sulfuric acid. The mixture is mechanically stirred during heating at 100 to 110° C. for three hours. Hydrogen chloride is evolved and the mixture darkens somewhat. After cooling to room temperature, the mixture is poured on ice. The resulting solution is of value as a tanning assistant and as a wetting agent. To isolate the free acid in pure condition, the solution is placed in a Cellophane bag and dialyzed in running water until free of sulfate ion, as indicated by testing the wash water. If the solution is diluted sufficiently, the Cellophane is not attacked by the acid during the dialysis. However, it is sometimes advantageous to partially neutralize the solution with sodium hydroxide before carrying out the dialysis. The free acid is obtained in pure, dry condition by evaporating the dialyzed solution. It is a brittle solid, soluble in water but insoluble in all common organic solvents. It contains no chlorine, showing that hydrolysis has simultaneously occurred, the $CCl_3$ group being in all probability hydrolyzed to a COOH group. The sulfur content, 15.85%, shows that on the average the molecule contains approximately one sulfonic acid group per styrene unit.

Example III

Two hundred twenty-five parts of a styrene/carbon tetrachloride telomer having an average composition of $Cl\text{—}(C_2H_3.C_6H_5)_{18}\text{—}CCl_3$ is dissolved in 900 parts of ethylene dichloride. The mixture is stirred mechanically and maintained at a temperature of 10 to 20° C. during the addition of 251 parts of chlorosulfonic acid. The reaction mass becomes very viscous. After five hours the mixture is drowned in water and the ethylene dichloride is removed by steam distillation. The remaining solution, which is very light in color, is concentrated to a weight of 2000 parts. It then contains 19.8% of active ingredient.

By fractional crystallization of the styrene telomer itself individual compounds may be obtained. These can be sulfonated as above to give the corresponding sulfonated compound having the formula

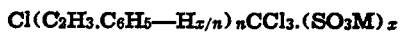

wherein $n$ is an integer from 2 to 30, $x$ is an integer having a value from 2 to $2n$, M is a member of the group consisting of hydrogen and positive salt-forming radicals and the $\text{—}SO_3M$ radicals are substituted for hydrogen in the aromatic nuclei.

Example IV

One part of a styrene/$CHCl_3$ telomer having an average composition $H(C_2H_3C_6H_5)_{56}.CCl_3$ is finely ground and mixed with 10 parts of concentrated sulfuric acid (96%). The mixture is heated at 100° and stirred for 16 hours. It is then poured into ice water. The resulting product is soluble in water.

Example V

One part of a finely ground telomer having the average composition of $Cl(C_2H_3C_6H_5)_{18}CCl_3$, after reaction with 4 parts of 96% sulfuric acid at 100° C. for 5 hours, is drowned in ice and filtered. The water-soluble sulfonic acid solution is then neutralized by the addition of 2.9 parts of sodium hydroxide. The resulting solution of sodium salts is useful in tanning applications.

A polysulfonic acid can be prepared from any telomer containing aromatic nuclei. Preferably the telomer has from 5 to 30 taxomon units, each of which contains an aromatic hydrocarbon nucleus. It is also preferred that the telomer have a halogen in an end group.

The taxogens can be aromatic compounds, having side chain olefinic unsaturation, such as styrene, alpha-methyl styrene, beta-ethyl styrene, 1-vinyl-4-chloro-benzene, 1,4-divinyl-benzene, vinyl naphthalenes, indene, etc. The preferred taxogens are polymerizable aromatic mono-olefinic hydrocarbons. Especially preferred are aromatic vinyl compounds of from 8 to 12 carbon atoms, such as styrene, nuclear substituted styrenes, and vinyl naphthalene.

Hydrogen chloride is a suitable telogen. Halogenated derivatives of aliphatic hydrocarbons, such as $CCl_4$, $CHCl_3$, $CH_2Cl_2$, $CH_2ClI$, $CH_3CCl_3$, $CH_3Br$, and especially halogenated methanes having at least two halogen atoms, are preferred.

The lower molecular weight, gummy telomers are readily soluble in the sulfonation mixtures, while the higher molecular weight telomers are brittle and may easily be reduced to a fine powder and dispersed in the sulfonation mixture. As illustrated in the examples, the telomer may be either warmed with concentrated sulfuric acid or dissolved in an inert solvent such as ethylene dichloride and treated with chlorosulfonic acid. The product is obtained by drowning the mixture in water. It is then ready for use, but if desired it may be neutralized with caustic and further purified by suitable means, e. g., dialysis. The conditions used for the sulfonation vary with the sulfonating agent employed and the type of product desired. In the examples, conditions suitable for the introduction of approximately one sulfonic acid group per styrene residue have been indicated, but it is possible to employ much lower temperatures for the introduction of only a few sulfonic acid groups per molecule or much higher temperatures for the introduction of more than one sulfonic acid group per styrene unit without causing excessive degradation of the molecule.

The free acids can be converted into their salts, preferably their water-soluble salts, such as alkali metal salts, especially sodium and potassium, ammonium salts, amine salts, etc. The salts are frequently more desirable than the free acid where it is desired to isolate and dry the product for storage or shipment. The water-soluble salts have properties similar to the free acids.

The process of the invention produces new compounds, usually as mixtures of compounds differing in the length of the telomer chain and the number of sulfonic acid groups. These compounds can be represented by the formula

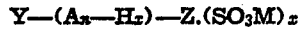

wherein $n$ is an integer having an average value of from 2 to 30, $x$ is an integer having an average value of from 2 to 2n, (A)n is a divalent radical formed by condensation of a polymerizable aromatic mono-olefinic compound, the end radicals Y and Z are fragments of a molecule YZ which has been made to react with the olefin, M is a member of the group consisting of H and positive salt-forming radicals, and the SO₃M groups are substituted for hydrogen (represented by the minus Hx in the formula), in aromatic nuclei. Preferably x equals n; i. e., there is one sulfonic acid radical per aromatic nucleus.

The products are useful as intermediates for the production of dispersing agents, surface-active agents, dyestuffs, and pigments.

Aqueous solutions of sulfonated telomers, e. g., those prepared from styrene and CCl₄, which have been freed of impurities, exert a pronounced bleaching or lightening of color when applied to chrome tanned leather and thus are advantageous for the preparation of white chrome leather. This effect is obtained by adding from 5 to 10 percent of the active telomer at pH values from 1.5 to 3.0, to freshly tanned and shaved chrome leather in accordance with the general practice for syntans.

The mixtures of telomers may be separated into individual telomers by molecular distillation, fractional crystallization, fractional precipitation, etc. Fractional crystallization is preferred in the separation of the individual sulfonated telomers. The individual sulfonated telomers have the formula

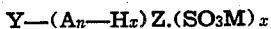

having the values above given.

It is apparent that many widely different embodiments of this invention may be made without departing from the spirit and scope thereof, and, therefore, it is not intended to be limited except as indicated in the appended claims.

I claim:

1. A mixture of linear polymeric materials having substituted by sulfonic acid groups hydrogen on nuclear carbon of linear polymeric materials having a chain of two to thirty

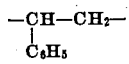

units, a chlorine atom satisfying one terminal valence of said chain and a —CCl₃ group satisfying the other terminal valence of said chain.

2. A mixture of linear polymeric materials having substituted by sulfonic acid groups hydrogen on nuclear carbon of linear polymeric materials having a chain of two to thirty

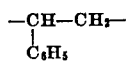

units and, terminally, two monovalent radicals which together form a polychlorinated methane.

3. A mixture of linear polymeric materials having substituted by sulfonic acid groups hydrogen on nuclear carbon of linear polymeric materials having a chain of two to thirty

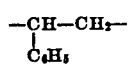

units and, terminally, two monovalent radicals which together form a polyhalogenated methane.

4. A mixture of linear polymeric materials having substituted by sulfonic acid groups hydrogen on nuclear carbon of linear polymeric materials having a chain of two to thirty

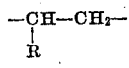

groups, R being a monovalent aromatic hydrocarbon radical, one terminal valence of said chain being satisfied by a chlorine atom and the other terminal valence being satisfied by a —CCl₃ group.

5. A mixture of linear polymeric materials having substituted by sulfonic acid groups hydrogen on nuclear carbon of linear polymeric materials having a chain of two to thirty

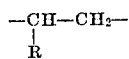

groups, R being a monovalent aromatic hydrocarbon radical, and, terminally, two monovalent radicals which together form a polychlorinated methane.

6. A mixture of linear polymeric materials having substituted by sulfonic acid groups hydrogen on nuclear carbon of linear polymeric materials having a chain of two to thirty

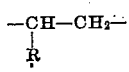

groups, R being a monovalent aromatic hydrocarbon radical, and, terminally, two monovalent radicals which together form a polyhalogenated methane.

7. A mixture of linear polymeric materials having substituted by sulfonic acid groups hydrogen on nuclear carbon of linear polymeric materials having a chain of two to thirty

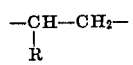

groups, R being a monovalent aromatic radical, and, terminally, two monovalent radicals which together form a polyhalogenated methane.

8. A mixture of linear polymeric materials having substituted, by substituents of the class consisting of the sulfonic acid group and metal salts thereof, hydrogen on nuclear carbon of linear polymeric materials having a chain of two to thirty

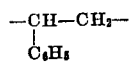

units and, terminally, two monovalent radicals which together form a polyhalogenated methane.

9. A mixture of linear polymeric materials having substituted, by substituents of the class consisting of the sulfonic acid group and metal salts thereof, hydrogen on nuclear carbon of linear polymeric materials having a chain of two to thirty

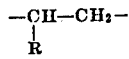

groups, R being a monovalent aromatic radical, and, terminally, two monovalent radicals which together form a polyhalogenated methane.

THOMAS A. FORD.